UNITED STATES PATENT OFFICE.

WILLIAM H. HOLLAND, OF CHELSEA, MASSACHUSETTS.

MEDICAL COMPOUND.

SPECIFICATION forming part of Letters Patent No. 241,014, dated May 3, 1881.

Application filed December 31, 1880. (No specimens.)

*To all whom it may concern:*

Be it known that I, WILLIAM H. HOLLAND, of Chelsea, in the county of Middlesex and State of Massachusetts, have invented certain Improvements in Medicated Malt Beer, of which the following is a specification.

This invention has for its object to provide an improved article of drink which shall possess all the nutritive and tonic and other beneficial properties of malt or lager beer without having the injurious effects of malt beer on the liver and other organs.

To these ends my invention consists in the combination, with malt or lager beer, of medical ingredients, as hereinafter described.

In making this compound I take ordinary malt or lager beer and add to it the following ingredients, in about the respective quantities named, to each gallon of beer, viz: dandelion, (either the liquid extract or ground,) one-sixteenth of a dram; thoroughwort, *(eupatorium,)* one-sixteenth of a dram; prickly-ash bark, one-sixteenth of a dram; iodide of potassium, one sixteenth of a dram; bromide of potassium, one-sixteenth of a dram. These ingredients may be added while the beer is being brewed or afterward; but I prefer to add them during the brewing process, because any sediment that might result from the addition of the ingredients will be worked out during the brewing. The medicated beer thus prepared is equally agreeable to the taste as ordinary beer, and it operates advantageously on the liver and the nerves, and is a valuable beverage for purifying the blood and relieving rheumatism.

An approximate dose of this compound will be one-half pint.

I claim—

The described compound or medicated malt beer, composed of malt beer and the following medical ingredients substantially in the proportions specified: dandelion, thoroughwort, prickly-ash bark, iodide of potassium, and bromide of potassium.

In testimony whereof I have signed my name to this specification, in the presence of two subscribing witnesses, this 27th day of December, A. D. 1880.

WILLIAM H. HOLLAND.

Witnesses:
C. F. BROWN,
W. CLIME.